United States Patent [19]
Chen

[11] Patent Number: 5,477,960
[45] Date of Patent: Dec. 26, 1995

[54] COMPACT DISK CASE

[76] Inventor: Hsien-ta Chen, No. 33, Jung Hsing Rd., Pa Te Hsiang, Taoyuan Hsien, Taiwan

[21] Appl. No.: 385,793

[22] Filed: Feb. 9, 1995

[51] Int. Cl.$^6$ .................................................. B65D 85/57
[52] U.S. Cl. ...................... 206/308.1; 206/309; 206/310
[58] Field of Search .............................. 206/308.1, 309, 206/310, 312, 526

[56] References Cited

U.S. PATENT DOCUMENTS

| | | | |
|---|---|---|---|
| 4,535,888 | 8/1985 | Nusselder | 206/308.1 |
| 4,778,047 | 10/1988 | Lay | 206/308.1 |
| 5,180,058 | 1/1993 | Hu | 206/308.1 |
| 5,246,107 | 9/1993 | Long et al. | 206/312 |
| 5,269,409 | 12/1993 | Brandt et al. | 206/310 |
| 5,322,162 | 6/1994 | Melk | 206/310 |
| 5,392,906 | 2/1995 | Taniyama | 206/309 |

*Primary Examiner*—David T. Fidei
*Attorney, Agent, or Firm*—Watson, Cole, Grindle & Watson

[57] ABSTRACT

A compact disc case includes an integrally formed foldable cover and a plate mounted to the cover. The cover has a first part having a first compact disc holding element and a first locking element, a middle part having a reinforcement structure which has two longitudinal parallel side walls defining an engaging slot, and a second part having a second holding element and a second locking element to engage with the first locking element when the cover is folded. The plate has two compact disc holding elements formed on both sides thereof and is inserted in the engaging slot and retained therein by way of engaging a number of connecting elements thereof with a corresponding number of catching elements formed on the side walls. Whereby, the case has a maximum capacity of containing up to four compact discs therein.

3 Claims, 3 Drawing Sheets

5,477,960

COMPACT DISK CASE

BACKGROUND OF THE INVENTION

1. Field of the Invention

The present invention relates to a compact disc (CD) case and, more particularly, to an improved CD case having a higher storage capacity.

2. Description of Related Art

A conventional CD case, as shown in FIG. 5, usually comprises a base cover 70, a receiving tray 80 detachably mounted to the base cover and having a CD holding element 82 formed at a center thereof with a circular recess 84 defined around the holding element for receiving a compact disc, and a top cover 90 pivotally connected to the base cover at one end thereof to enclose the case, whereby a compact disc is retained therein.

Although this type of CD case is Widely used in the market currently, it has some well recognized drawbacks, such as, it takes three different components to make a case to store only one compact disc, and also it needs tiresome assembling processes in order to be constructed, which cause high manufacturing costs. Furthermore, the top and base covers are detachably and loosely connected thus the top cover is often lost and thus, proper protection to the CD is not provided which causes inconvenience in use.

The present invention provides an improved compact disc case to mitigate and/or obviate the aforementioned problems.

SUMMARY OF THE INVENTION

One object of the present invention is to present an improved compact disc case that can contain up to four compact discs therein.

Another object of the present invention is to present an improved compact disc case which can be more economically manufactured and assembled.

The above-mentioned objects of the present invention are achieved by providing a compact disc case which generally includes an integrally formed foldable cover having a first part, a second part and a middle part and a separation plate mounted to the foldable cover at the middle part.

The first part has a first holding element formed at a center of an inner face thereof for releaseably holding a compact disc and a first locking element formed at a first edge of the cover.

The second part has a second holding element formed at a center of an inner face thereof for releaseably holding another compact disc and a second locking element formed at a second edge of the cover to detachably engage with the first locking element and thereby close the case when the cover is folded.

The middle part has a reinforcement component extending along a width of the cover on an inner face of the middle part. The reinforcement component comprises two longitudinal parallel walls and each of the walls has a plurality of catching elements formed thereon along its length.

The separation plate has a third and a fourth holding element formed at a center of one face and the other face thereof respectively and a plurality of connecting elements formed along one edge thereof to engage with the catching elements and thereby to couple to the cover.

In accordance with one embodiment of the present invention, the first part and second part further comprise a first table and a second table formed around the first and the second holding element respectively with a diameter smaller than that of a compact disc to facilitate accessing a compact disc.

In accordance with another embodiment of the present invention, each catching element of the reinforcement component comprises a protrusion inwardly projecting from a side wall of the reinforcement component and each connecting element comprises a recess. Each protrusion has an oblique upper face to facilitate an insertion of the plate.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
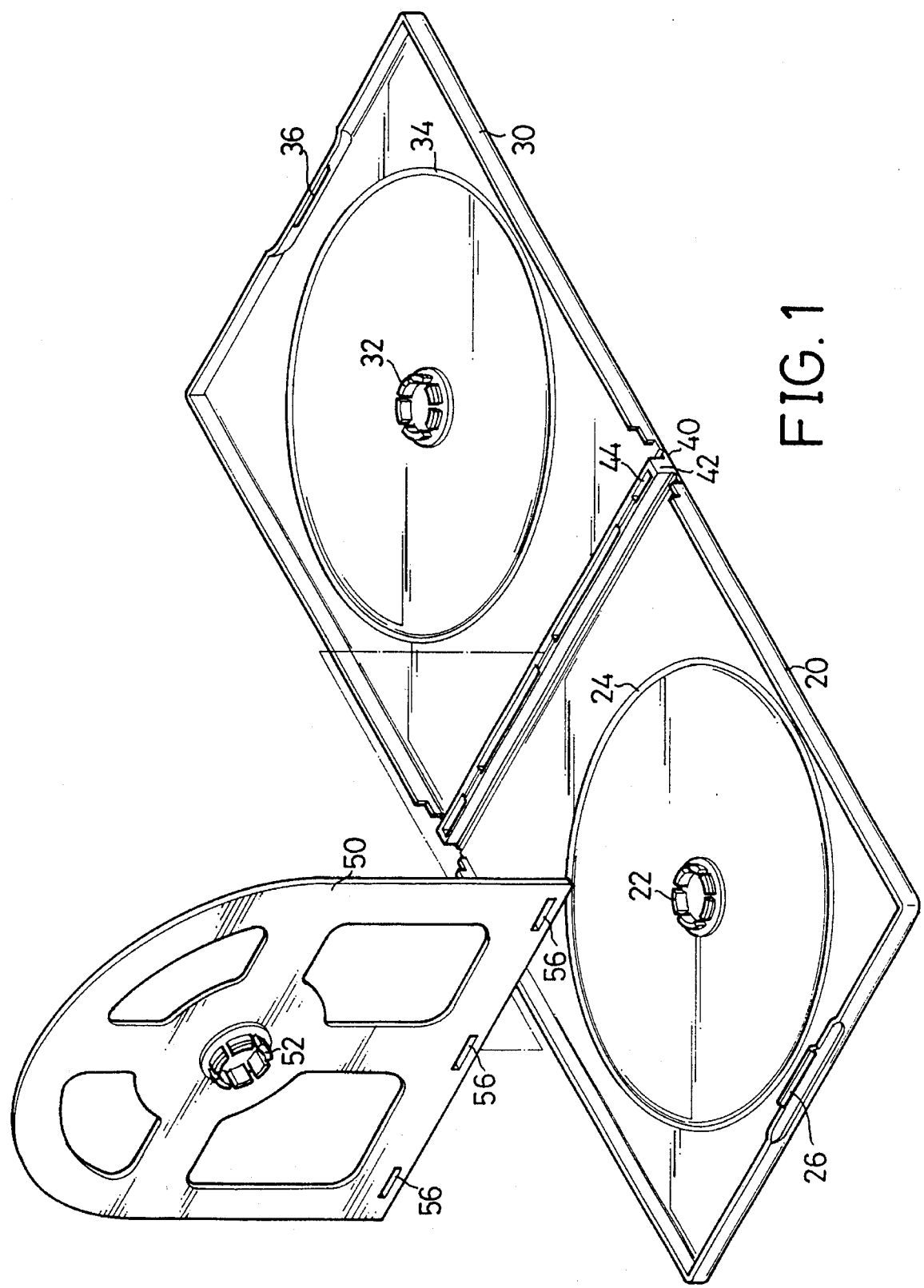
FIG. 1 is an exploded perspective view of a compact disc case in accordance with the present invention.
Figure 2:
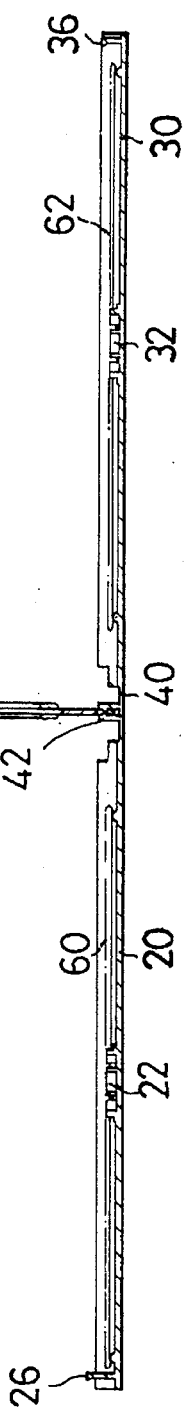
FIG. 2 is a cross-sectional side view of an assembled compact disc case in according to the present invention with compact discs, which are shown in phantom lines, retained therein.

Referring to the drawings and initially to FIGS. 1 and 2, the compact disc case in accordance with the present invention generally includes an integrally formed foldable cover 10 having a first part 20, a second part 30 and a middle part 40, and a separation plate 50 mounted to the cover 10 at the middle part 40.

The first part 20 has a first holding element 22 formed at a center of an inner face thereof for releaseably holding a compact disc 60, a first table 24 upwardly protruding from the inner face and around the first holding element 22, three side walls (not labeled) formed at three edges thereof except for the edge adjoining the middle part 40 and a first locking element 26 formed at an edge opposite to the edge adjoining the middle part 40.

Similar to the configuration of the first part 20, the second part 30 having a second holding element 32 formed at a center of an inner face thereof for releaseably holding another compact disc 62, three side walls (not labeled) formed at three edges thereof except for the edge adjoining the middle part 40 and a second locking element 36 formed at an edge opposite to the edge adjoining the middle part 40 to detachably engage with the first locking element.

Figure 3:
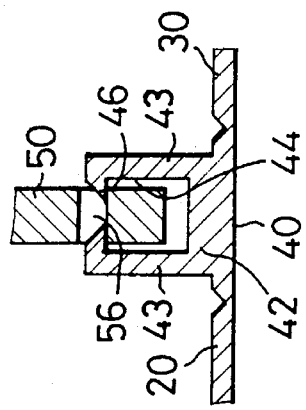
FIG. 3 is an enlarged fragmentary sectional side view of FIG. 2, showing the engagement details between the cover and the plate.

As best seen in FIG. 3, the middle part 40 has a reinforcement component 42 projecting upwardly and extending along a width of the cover on an inner face of the middle part. The reinforcement component 42 comprises two longitudinal side walls 43 and two end walls (not labeled) which together define a slot 44 therein and each side wall 43 has a plurality of catching elements 46 formed thereon along its length. Preferably, the catching element 46 comprises a protrusion projecting inwardly from a top end of the side wall 43.

Referring back to FIGS. 1 and 2, the plate 50 comprises a third and a fourth holding elements 52, 54 formed at a center of one face and the other face thereof for holding a third 64 and fourth compact disc 66 respectively and a plurality of connecting elements 56 formed along one edge thereof. Preferably, the connecting element 56 is in a form of a recess. Further, the first, second, third and fourth compact disc holding elements are similar to a compact disc holding structure used in a conventional compact disc case and thus will not be further described herein.

Figure 4:
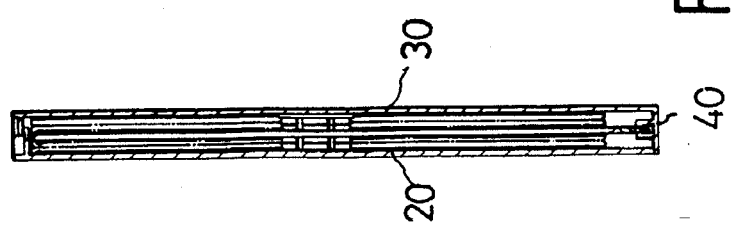
FIG. 4 is a cross-sectional view of a compact disc case in according to the present invention which is in a closed state.
Figure 5:
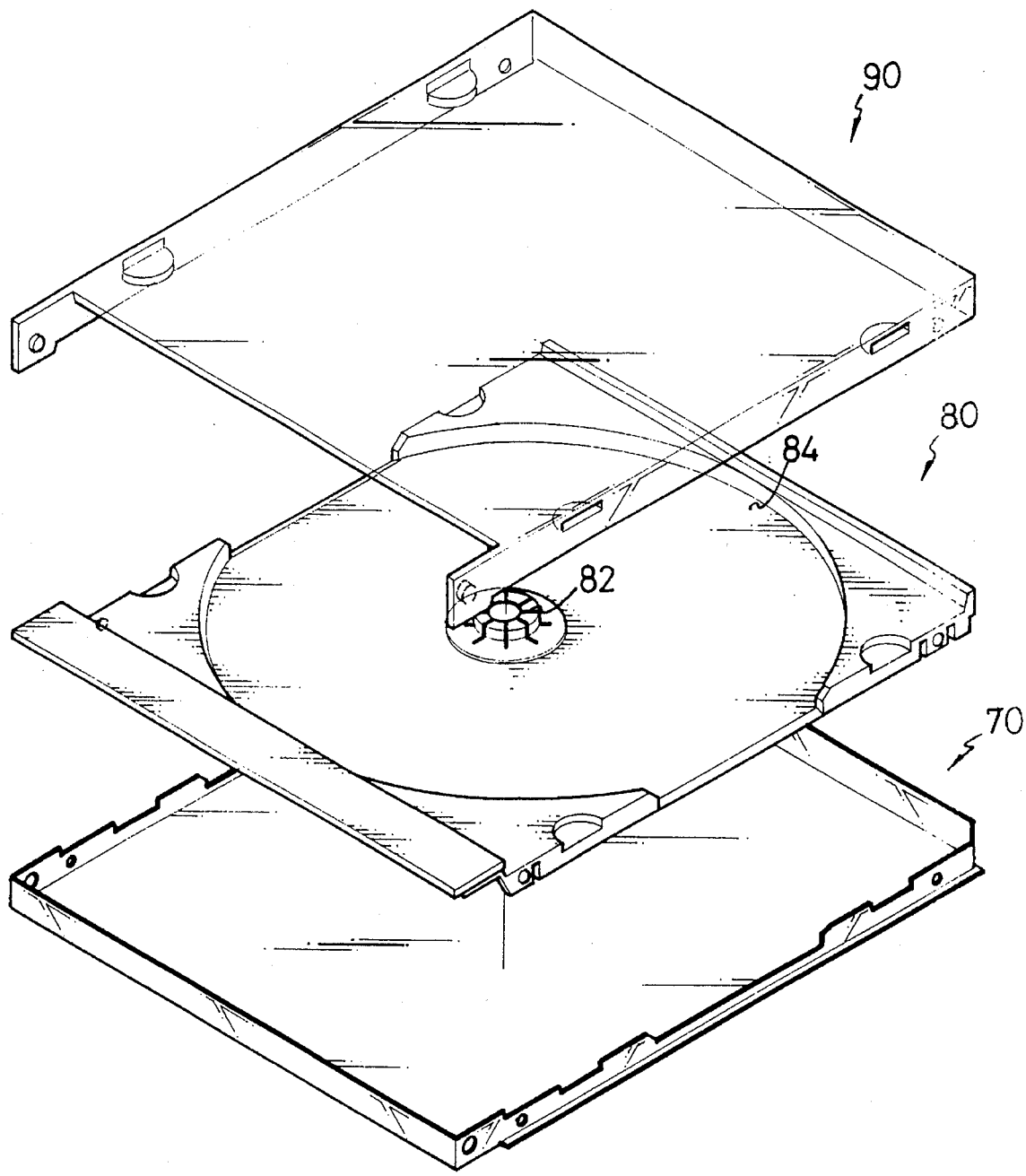
FIG. 5 is an exploded perspective view showing a conventional compact disc case.

In assembly, the plate 50 is coupled to the cover 10 by inserting the edge comprising the connecting elements 56 of the plate 50 into the slot 44. By way of an engagement of the catching elements 46 and connecting elements 56, as shown in FIG. 3, the plate 50 is coupled to the cover 10 to form the compact disc case. Preferably, the catching element 46 has an oblique upper face to facilitate the insertion of the plate 50. When the cover 10 is folded, the plate 50 and the compact discs 60, 62, 64 and 66 are enclosed therein, as shown in FIG. 4.

Although the invention has been explained in relation to its preferred embodiment, it is to be understood that many other possible modifications and variations can be made without departing from the spirit and scope of the invention as hereinafter claimed.

I claim:

1. A compact disc case comprising:

an integrally formed foldable cover having a first part, a second part and a middle part;

the first part having a first holding element formed at a center of an inner face thereof for releaseably holding a compact disc and a first locking element formed at a first edge of the cover;

the second part having a second holding element formed at a center of an inner face thereof for releaseably holding another compact disc and a second locking element formed at a second edge of the cover to detachably engage with the first locking element and thereby retain closed the case when the cover is folded;

the middle part having a reinforcement component extending along a width of the cover on an inner face of the middle part, the reinforcement component comprising two longitudinal parallel walls and each having a plurality of catching elements formed thereon along its length; and a plate mounted to the foldable cover at the middle part;

the plate having a third and a fourth holding element formed at a center of one face and the other face thereof respectively and a plurality of connecting elements formed along one edge thereof to engage with the catching elements and thereby to couple to the cover.

2. A compact disc case as claimed in claim 1 wherein the first part and second part further comprise a first table and a second table formed around the first and the second holding element respectively with a diameter less than that of a compact disc to facilitate accessing a compact disc.

3. A compact disc case as claimed in claim 1 wherein each catching element comprises a protrusion inwardly projecting from a wall of the reinforcement component and each connecting element comprises a recess, each protrusion having an oblique upper face to facilitate an insertion of the plate.

\* \* \* \* \*